US010740769B2

(12) United States Patent
Chavarria (10) Patent No.: US 10,740,769 B2
(45) Date of Patent: Aug. 11, 2020

(54) METHOD AND SYSTEM FOR CONSUMER PURCHASE USING PHYSIOLOGICAL CHANGE MONITORING

(71) Applicant: Mastercard International Incorporated, Purchase, NY (US)

(72) Inventor: Pedro Chavarria, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 259 days.

(21) Appl. No.: 15/662,786

(22) Filed: Jul. 28, 2017

(65) Prior Publication Data

US 2019/0034941 A1    Jan. 31, 2019

(51) Int. Cl.
*G06Q 30/02* (2012.01)
*G06F 3/01* (2006.01)
*G06K 9/00* (2006.01)

(52) U.S. Cl.
CPC ......... *G06Q 30/0201* (2013.01); *G06F 3/013* (2013.01); *G06K 9/00892* (2013.01); *G06F 2203/011* (2013.01); *G06K 2009/00939* (2013.01)

(58) Field of Classification Search
CPC .............................. G06Q 30/02; H04W 4/00
USPC ....................................................... 455/414.1
See application file for complete search history.

(56) References Cited

U.S. PATENT DOCUMENTS

| | | | |
|---|---|---|---|
| 2011/0060666 A1* | 3/2011 | Gromek | G06F 3/0482 705/27.2 |
| 2012/0329432 A1* | 12/2012 | Gupta | G06Q 30/02 455/414.1 |
| 2015/0371516 A1* | 12/2015 | Petersen | G08B 21/02 340/539.12 |

\* cited by examiner

*Primary Examiner* — Marilyn G Macasiano
(74) *Attorney, Agent, or Firm* — Buchanan Ingersoll & Rooney PC (57) ABSTRACT

A method for product identification based on physiological response includes: displaying a plurality of display screens over a period of time, wherein at least one display screen includes one or more displayed products; storing a display time for each displayed product corresponding to a time of the period of time at which the displayed product and the respective display screen is displayed on the display device; receiving a plurality of physiological measurements over the period of time for a first physiological function of a user of the computing device; detecting a change in the first physiological function based on the plurality of physiological measurements and a change time for the detected change; identifying a specific displayed product based on a correspondence between the respective display time and the detected change time; and transmitting product data associated with the specific displayed product.

14 Claims, 5 Drawing Sheets

METHOD AND SYSTEM FOR CONSUMER PURCHASE USING PHYSIOLOGICAL CHANGE MONITORING

FIELD

The present disclosure relates to the identification of products based on a consumer's physiological response, specifically the use of heart rate tracking, eye tracking, and other physiological measurements to identify a change in a consumer's physiological response when exposed to a product for identification thereof to assist in the purchase of said product.

BACKGROUND

When a consumer uses a computing device, they are often exposed to a variety of different products, particularly when browsing the Internet where products are advertised either directly or indirectly. In many cases, a consumer may be exposed to a vast number of products at once. In these instances, the consumer may react positively to a product, but may neglect to move forward with the purchase of said product, sometimes unintentionally. For example, the consumer may be presented with a dozen products at once, one of which attracts their attention, but may be distracted by the overwhelming number of products being presented. In another example, the consumer may be interested in a product via an advertisement, but may be focusing on the web page containing the advertisement and neglect to look into the product, perhaps thinking he or she might do so at a later time.

Targeted advertising mitigates to some degree this problem by presenting advertisements that the consumer is likely to be interested in and reducing the distraction factor. Modern targeted advertising uses demographics and consumer behavior to predict an individual's potential interest, often using powerful computers to automate the process. But what is lacking in a real time or near real time way to detect a consumers interest in a particular product outside of a controlled environment, such as a consumer study group. Currently there is an inability for a computing device to identify when a consumer may be interested in a product that is being viewed in a real-life setting. Standard computing devices lack the technology to measure or identify any reaction on the part of the user, and thus cannot provide assistance to the user in identifying products for purchase. Thus, there is a need for a technological solution to enable a computing device to identify when a consumer is interested in a product based on physiological response and identify the specific product.

SUMMARY

The present disclosure provides a description of systems and methods for the identification of products based on physiological response. A computing device identifies products that are displayed to a consumer and measures the consumer's physiological responses to exposure to identify when the consumer is interested in a product. In cases where multiple products may be displayed, the computing device may use eye tracking to identify which of the products is being viewed by the consumer at the time of increase physiological reaction. Such methods may facilitate the identification and purchase of products a consumer may be interested in, without requiring deliberate action on the part of the consumer. As a result, the consumer may engage in useful purchases when they otherwise would not have, to the benefit of consumers and merchants.

A method for product identification based on physiological response includes: displaying, by a display device interfaced with a computing device, a plurality of display screens over a period of time, wherein at least one display screen includes one or more displayed products; storing, in a memory of the computing device, a display time for each displayed product corresponding to a time of the period of time at which the displayed product and the respective display screen is displayed on the display device; receiving, by a receiving device of the computing device, a plurality of physiological measurements over the period of time for a first physiological function of a user of the computing device; detecting, by a detection module of the computing device, a change in the first physiological function based on the plurality of physiological measurements and a change time for the detected change; executing, by a querying module of the computing device, a query on the memory to identify a specific displayed product based on a correspondence between the respective display time and the detected change time; and electronically transmitting, by a transmitting device of the computing device, product data associated with the specific displayed product.

A system for product identification based on physiological response includes: a display device interfaced with a computing device configured to display a plurality of display screens over a period of time, wherein at least one display screen includes one or more displayed products; a memory of the computing device configured to store a display time for each displayed product corresponding to a time of the period of time at which the displayed product and the respective display screen is displayed on the display device; a receiving device of the computing device configured to receive a plurality of physiological measurements over the period of time for a first physiological function of a user of the computing device; a detection module of the computing device configured to detect a change in the first physiological function based on the plurality of physiological measurements and a change time for the detected change; a querying module of the computing device configured to execute a query on the memory to identify a specific displayed product based on a correspondence between the respective display time and the detected change time; and a transmitting device of the computing device configured to electronically transmit product data associated with the specific displayed product.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for the Product Identification Based on Physiological Response

Figure 1:
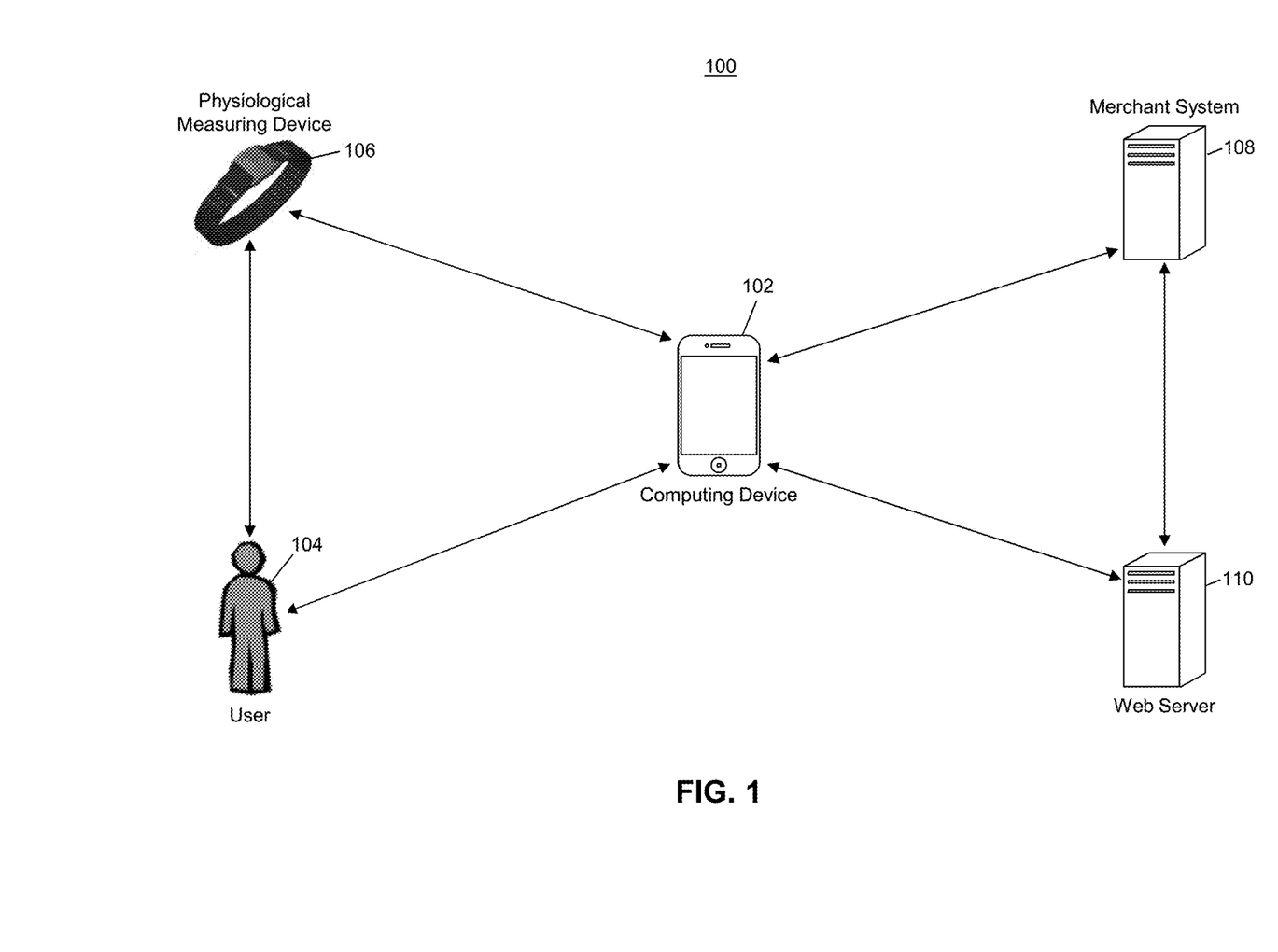
FIG. 1 is a block diagram illustrating a high level system architecture for the identification of products based on consumer physiological response in accordance with exemplary embodiments.

FIG. 1 illustrates a system 100 for the identification of products displayed on a computing device 102 based on the physiological responses to the products by a user 104 thereof.

The system 100 may include the computing device 102. The computing device 102, discussed in more detail below, may be a user computing device specifically configured to perform the functions discussed herein, such as a specially programmed desktop computer, laptop computer, notebook computer, tablet computer, cellular phone, smart phone, smart watch, smart television, wearable computing device, implantable computing device, gaming system, etc. The computing device 102 may include or otherwise be interfaced with a physiological measuring device 106. The physiological measuring device 106 may be configured to measure one or more physiological functions of the user 104 over time. Physiological functions may include, for example, heart rate, respiration rate, pupil dilation, eye tracking, skin temperature, skin color change, body secretion/chemical sensor, body movement or exertion, or nearly any detectable physiological change that is measurable but a sensor (camera, photodiode, accelerometers, temperature sensors, etc.) equipped computing device, etc. For instance, the physiological measuring device 106 may be a heart rate monitor, optical imager, or other suitable device such as found in wearable and/or personal computing devices on the market at the time of filing this application.

The computing device 102 may be configured to display one or more products to the user 104 with a display device interfaced therewith. The computing device 102 may store the time at which each product is displayed on the display device and thus exposed to the user 104. The computing device 102 may receive the physiological measurements from the physiological measuring device 106, which may indicate the physiological function(s) of the user 104 over a period of time. The computing device 102 may identify a specific when one or more of the physiological functions of the user 104 changes, such as when the user's heart rate spikes, their respiration rate increases, their pupils dilate, etc. In some cases, there may be a confidence level used for each physiological function, such that the physiological function must change beyond the confidence level before being considered a "change" as discussed herein. For example, the computing device 102 may not consider the user's heart rate as a change for triggering the functions discussed herein unless the heart rate increases by a minimum of fifteen beats per minute, to reduce the number of false positives. In such cases, the confidence levels for physiological functions may vary based on the function and the user 104, as the typical variations in one user's physiological functions may be different from those of another user.

The computing device 102 may identify the change in a physiological function of the user 104 and may identify the time at which the change happened based on the data captured by the physiological measuring device 106. In cases where multiple physiological functions may be captured and the corresponding data provided to the computing device 102, the computing device 102 may, in some embodiments, require the change to occur in more than one physiological function. For example, if heart rate, respiration rate, and pupil dilation are all measured, the computing device 102 may require a change to be detected at a single time for two of the three functions to trigger the functions discussed herein, such as to reduce the number of false positives or changes in physiological function that may be caused by outside sources.

Once the time of the change of the physiological function(s) is identified, the computing device 102 may identify the product that was displayed at that same time. In instances where multiple products may have been displayed on the display device at that time, the computing device 102 may utilize eye tracking to identify the specific product being viewed by the user 104 at the time of the change in physiological function. For instance, the computing device 102 may include or otherwise be interfaced with an optical imager (e.g., as the physiological measuring device 106 or anther device) that is configured to capture the eye movement of the user 104. The optical imager may capture the eye movement of the user 104 and the computing device 102 may use standard eye tracking techniques to identify a portion of the display device that is being viewed by the user 104 at the time when the change in physiological function was detected. The computing device 102 may then identify the product displayed at that portion of the display device at that time, to identify the product that caused the change in physiological function in the user 104.

Once the product is identified, the computing device 102 may display, via the interfaced display device, product data for the identified product to the user 104. In some cases, the user may be prompted for purchase of the product. For example, the computing device 102 may display a web page to the user 104 via web page data received from a web server 110. The web page data may include one or more products for purchase that are displayed to the user 104 as part of the web page. The computing device 102 may detect a change in physiological function of the user 104 when a specific product is displayed and may present additional product data for that product to the user 104, which may be received from the web server 110 with the web page data or received separately from an entity associated with the specific product, such as a merchant system 108 corresponding to a merchant offering the product for sale. The additional product data may include any product details of the product that may be of interest to a user 104 prior to purchase thereof, such as product name, product description, price, sizing information, product images, etc.

In some embodiments, the computing device 102 may be configured to facilitate purchase of the product. For instance, the computing device 102 may prompt the user 104 for purchase of the product, and may, if the user wishes to proceed with purchase, perform functions relating to the initiation of a payment transaction for the product using methods and systems that will be apparent to persons having skill in the relevant art, such as adding the product to a shopping cart in the web page or an application program and carrying out a checkout process using payment data supplied by the user 104 or previously stored in the computing device 102 (e.g., in an electronic wallet application program). As a result, the user 104 may be able to purchase a product they are interested in, without having to explicitly indicate interest, via changes in their physiological functions when exposed to the product.

The methods and systems discussed herein thus enable the computing device 102 to facilitate in the identification of products that a user 104 may be interested in, without the user 104 having to explicitly indicate interest, via changes in their physiological functions. In some cases, the computing device 102 may thus identify products that the user 104 may not have consciously acknowledged their interest in a product, facilitating purchases that may not have otherwise occurred. For instance, a user who is wearing an activity tracker (e.g., a Fitbit®) and looking at a website on a Bluetooth® paired computing device that has been specifically programmed to carry out the functions disclosed herein might physiologically react to a product on a webpage indicating interest. The paired computing device can then send a signal either through the browser used in viewing the webpage or another communication channel to the server providing the content of interest, and cause it to pop-up an advertisement and/or order screen with product details, order input, shipping information and payment options, such as may be provided by an electronic wallet function such as MasterPass®, all without the user needing to take affirmative action. There are many other possibilities, and the invention is not limited in any way by this example. As such, the computing device 102 may benefit users 104 as well as merchants 108, product manufacturers, and other entities by facilitating payment transactions that may otherwise not have taken place. In addition, the computing device 102 provides greater convenience to users 104 in facilitating the purchase of products, as the user 104 can engage in transactions with less interaction and less functions to be performed thereby.

Computing Device

Figure 2:
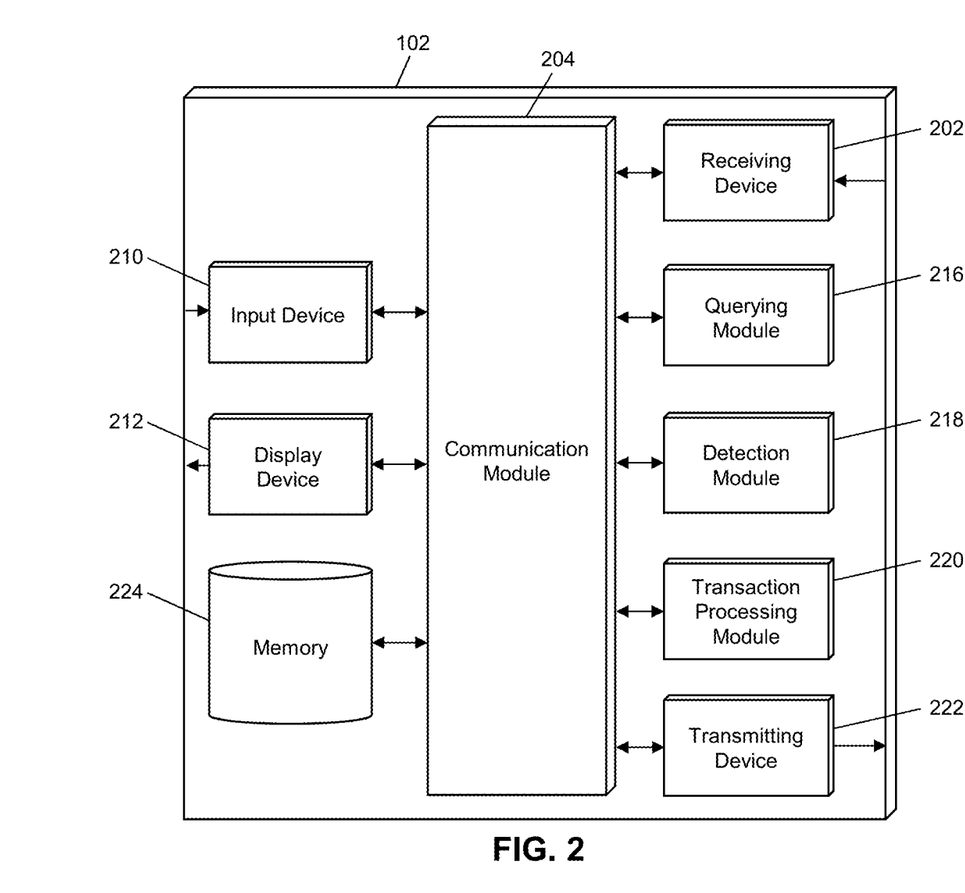
FIG. 2 is a block diagram illustrating the computing device of the system of FIG. 1 for the identification of products based on physiological response in accordance with exemplary embodiments.

FIG. 2 illustrates an embodiment of a computing device 102 in the system 100. It will be apparent to persons having skill in the relevant art that the embodiment of the computing device 102 illustrated in FIG. 2 is provided as illustration only and may not be exhaustive to all possible configurations of the computing device 102 suitable for performing the functions as discussed herein. For example, the computer system 500 illustrated in FIG. 5 and discussed in more detail below may be a suitable configuration of the computing device 102.

The computing device 102 may include a receiving device 202. The receiving device 202 may be configured to receive data over one or more networks via one or more network protocols. In some instances, the receiving device 202 may be configured to receive data from physiological measuring devices 106, merchant systems 108, web servers 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by web servers 110 and merchant systems 108, which may be superimposed or otherwise encoded with product data to be displayed to users 104, including product data to be displayed across one or more display screens as part of web pages or application programs, alternative to or in addition to, product data to be displayed if the user 104 is interested in a product. In some embodiments, the data may include the positioning of each product in the data to be displayed. The receiving device 202 may also be configured to receive data signals electronically transmitted by physiological measuring devices 106, which may be superimposed or otherwise encoded with a plurality of physiological measurements captured over a period of time by the corresponding physiological measuring device 106. In some instances, physiological measuring devices 106 may be included in the computing device 102.

The computing device 102 may also include a communication module 204. The communication module 204 may be configured to transmit data between modules, engines, databases, memories, and other components of the computing device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 102 and external components of the computing device 102, such as externally connected databases, display devices, input devices, etc. The computing device 102 may also include a processing device. The processing device may be configured to perform the functions of the computing device 102 discussed herein as will be apparent to persons having skill in the relevant art. In some embodiments, the processing device may include and/or be comprised of a plurality of engines and/or modules specially configured to perform one or more functions of the processing device, such as a querying module 216, detection module 218, transaction processing module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing device 102 may also include or be otherwise interfaced with one or more input devices 210. The input devices 210 may be internal to the computing device 102 or external to the computing device 102 and connected thereto via one or more connections (e.g., wired or wireless) for the transmission of data to and/or from. The input devices 210 may be configured to receive input from a user (e.g., the user 104) of the computing device 102, which may be provided to another module or engine of the computing device 102 (e.g., via the communication module 204) for processing accordingly. Input devices 210 may include any type of input device suitable for receiving input for the performing of the functions discussed herein, such as a keyboard, mouse, click wheel, scroll wheel, microphone, touch screen, track pad, camera, optical imager, etc. The input device 210 may be configured to, for example, receive input from a user 104 regarding instructions to proceed with the purchase of a product where interested was identified based on physiological function, where such instructions may include selection of a transaction account, shipping details, purchase quantity, etc. In some cases, input devices 210 may include physiological measuring devices 106 configured to measure physiological functions of the user 104 over a period of time using traditional methods and systems. In some instances, input devices 210 may also include an optical imaging device configured to track eye movement of the user 104.

The computing device 102 may also include or be otherwise interfaced with a display device 212. The display device 212 may be internal to the computing device 102 or external to the computing device 102 and connected thereto via one or more connections (e.g., wired or wireless) for the transmission of data to and/or from. The display device 212 may be configured to display data to a user (e.g., the user 104) of the computing device 102. The display device 212 may be any type of display suitable for displaying data as part of the functions discussed herein, such as a liquid crystal display, light emitting diode display, thin film transistor display, capacitive touch display, cathode ray tube display, light projection display, etc. In some instances, the computing device 102 may include multiple display devices 212. The display device 212 may be configured to, for example, display one or more products to the user 104 that are eligible for purchase, where each product may be displayed at a specific portion of the display device 212 and at a specific time.

The computing device 102 may also include a memory 224. The memory 224 may be configured to store data for use by the computing device 102 in performing the functions discussed herein, such as public and private keys, symmetric keys, etc. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the computing device 102 in the performance of the functions disclosed herein as will be apparent to persons having skill in the relevant art. In some embodiments, the memory 224 may be comprised of or may otherwise include a relational database that utilizes structured query language for the storage, identification, modifying, updating, accessing, etc. of structured data sets stored therein. The memory 224 may be configured to store, for example, a display time, and, in some cases, display location, for each of the one or more products displayed to the user 104. In some cases, the memory 224 may also be configured to store physiological function data, such as the confidence levels for the user's physiological functions. The memory 224 may be further configured to store eye movement data for use in identifying portions of the display device 214 viewed by the user 104 over a period of time.

The computing device 102 may include a querying module 216. The querying module 216 may be configured to execute queries on databases to identify information. The querying module 216 may receive one or more data values or query strings, and may execute a query string based thereon on an indicated database, such as the memory 224, to identify information stored therein. The querying module 216 may then output the identified information to an appropriate engine or module of the computing device 102 as necessary. The querying module 216 may, for example, execute a query on the memory 224 to identify a product that was displayed at a time when a change in the physiological functions of the user 104 occurred.

The computing device 102 may also include a detection module 218. The detection module 218 may be configured to detect changes in physiological functions and detect the time and location of displayed products for the computing device 102 as part of the functions discussed herein. The detection module 218 may be configured to analyze physiological measurements for a user 104 over a period of time and detect a change in the related physiological function based on the values of the measurements, and also based on confidence levels or other criteria. For instance, though empirical testing of a panel of test subjects or the actual user, various physiological changes can and have been be correlated to emotional responses. A 10% dilation of a human's pupil might be correlated to interest in having a product, for example, with a statistical certainty, of say 60%. But coupled with a 5% increase in heart rate, the certainty might be increased to 80%, for example. The computing device 102, or a computer connected to it, can include memory correlating these values. The detection module 218 may also be configured to detect a portion of the display device 214 being viewed by the user 104 based on eye movement data received from an input device 210 configured to track the user's eye movement. The detection module 218 may also be configured to detect a product displayed on the display device 214 at the time a change in physiological function occurred and displayed at the portion of the display device 214 viewed by the user 104 at that time.

The computing device 102 may also include a transaction processing module 220. The transaction processing module 220 may be configured to perform functions of the computing device 102 related to the initiation and processing of electronic payment transactions, as will be apparent to persons having skill in the relevant art. The transaction processing module 220 may be configured to, for example, capture and store payment data or other billing information, shipping information, etc., and may be configured to initiate the electronic transmission of such data to web servers 110 and/or merchant systems 108 for use in the processing of an electronic payment transaction, such as for the purchase of a product identified via the detection module 218.

The computing device 102 may also include a transmitting device 222. The transmitting device 222 may be configured to transmit data over one or more networks via one or more network protocols. In some instances, the transmitting device 222 may be configured to transmit data to merchant systems 108, web servers 110, and other entities via one or more communication methods, local area networks, wireless area networks, cellular communication, Bluetooth, radio frequency, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals superimposed or otherwise encoded with transaction data for a payment transaction to web servers 110 and/or merchant systems 108, where the transaction data may include payment information, billing information, shipping information, or other data used in the processing of an electronic payment transaction. In some embodiments, the transmitting device 222 may be configured to electronically transmit data signals superimposed or otherwise encoded with data requests, such as to physiological measuring devices 106 requesting physiological measurements, and/or to web servers 110 and merchant systems 108 requesting additional product data.

Process for Purchase of a Product Identified Via Physiological Functions

Figure 3:
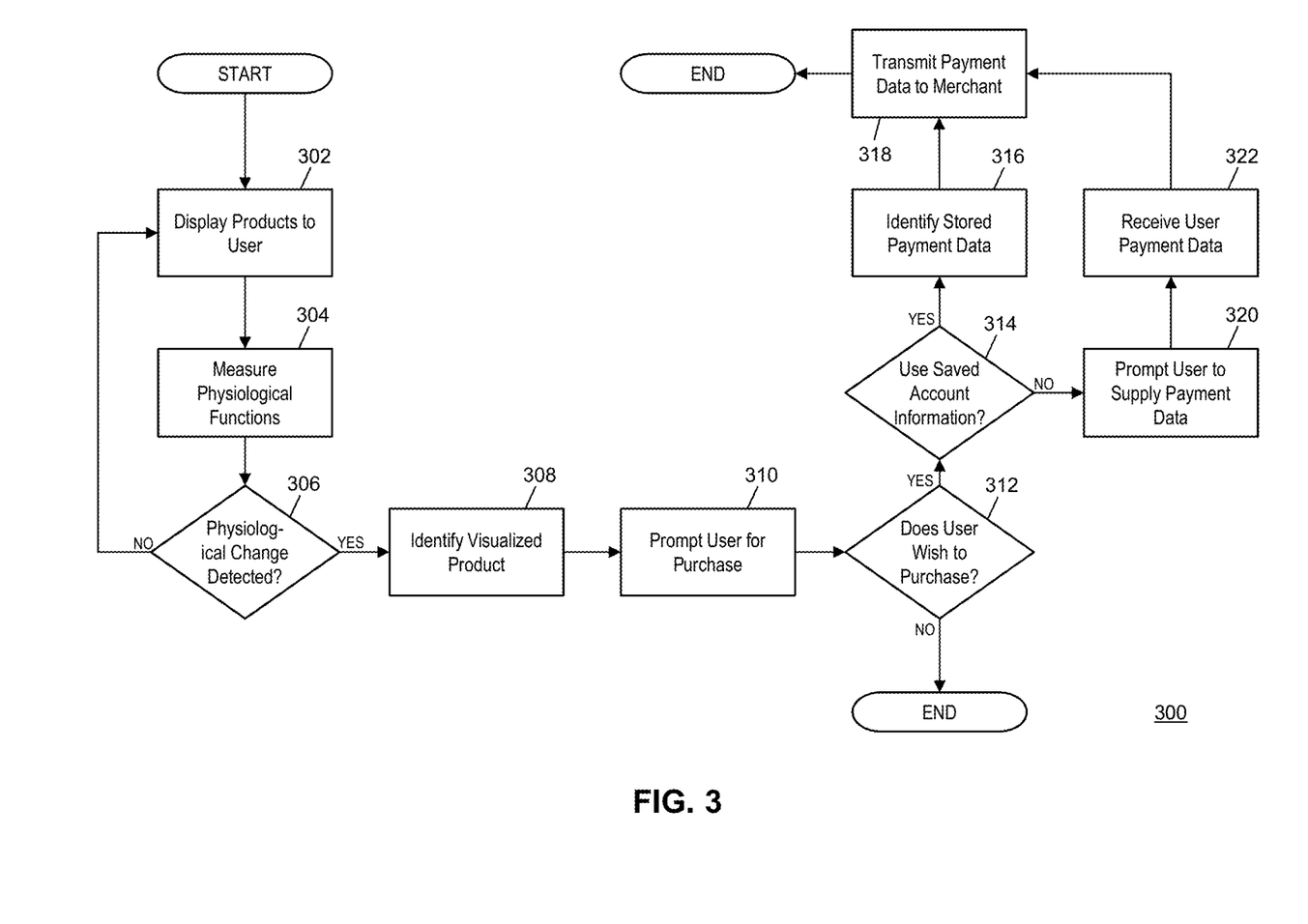
FIG. 3 is a flow diagram illustrating a process for identifying products based on consumer physiological response using the computing device of FIG. 2 in accordance with exemplary embodiments.

FIG. 3 illustrates a process executed by the computing device 102 of the system 100 for facilitating the purchase of a product identified based on changes in physiological functions of a user 104 of the computing device 102.

In step 302, the display device 214 interfaced with the computing device 102 may display one or more products to the user 104, such as on a web page or via an application program executed by the computing device 102. Each product may be displayed at a specific time and may be displayed at a specific portion of the display device 214. In step 304, the computing device 102 may, via one or more physiological measuring devices 106, measure physiological functions of the user 104, such as heart rate, respiration rate, pupil dilation, etc., as discussed above. In step 306, the detection module 218 may attempt to detect a change in physiological function, where the detection of a change may be based on the physiological function measurements.

If no change in physiological function is detected, the process 300 may return to step 302 where products may be continued to be displayed to the user 104. If a change in physiological function is detected, then, in step 308, the detection module 218 may detect the product visualized by the user 104 at the time of the change in the physiological function. The product may be identified based on the time when the change in the physiological function occurred and where the user was looking (e.g., based on eye tracking movements captured via an input device 210) at the time of the change, corresponding to the time when each product was displayed and the portion of the display device 214 at which it was displayed. In step 310, the display device 214 may display a prompt to the user 104 for purchase of the identified product. In some cases, the prompt may include additional data for the product that had not been previously displayed.

In step 312, the computing device 102 may determine if the user 104 wants to purchase the product. The determination may be based on a response to the prompt received via the input device 210. If the user 104 does not wish to purchase the product, then the process 300 may be completed. If the user 104 does wish to purchase the product, then, in step 314, the computing device 102 may determine if the user 104 wants to use saved account information for funding the purchase of the product. Such a determination may be based on the response to the prompt that was received via the input device 210. For instance, the user 104 may be prompted to select a saved transaction account or if new transaction account details are to be provided.

If a saved transaction account is to be used, then, in step 316, the querying module 216 of the computing device 102 may execute a query on the memory 224 of the computing device 102 to identify the saved transaction account data, which may include, for instance, payment credentials, a transaction account number, payment cryptograms, etc. In step 318, the transmitting device 222 of the computing device 102 may electronically transmit the saved transaction account data and other purchase information (e.g., product quantity, size information, shipping information, etc.) to the merchant system 108 associated with the product for purchase thereof. If, in step 314, it was determined that a saved transaction account is not being used, then, in step 320, the display device 214 may display, to the user 104, a prompt for payment data. In step 322, the input device 210 of the computing device 102 may receive the payment data as input from the user 104. The process 300 may then proceed to step 318 where the input payment data is electronically transmitted to the merchant system 108 along with the other purchase information.

Exemplary Method for Product Identification Based on Physiological Response

Figure 4:
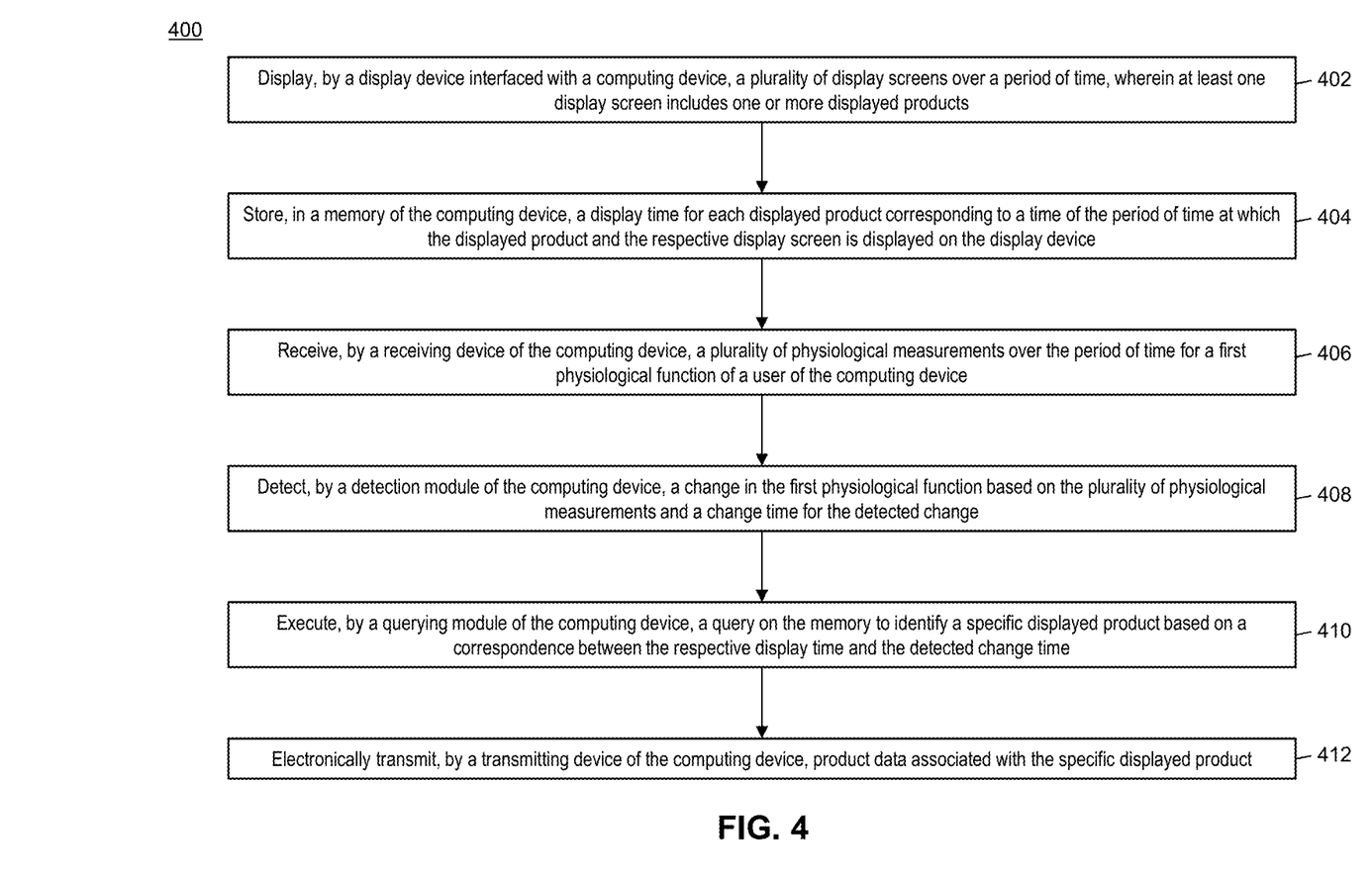
FIG. 4 is a flow chart illustrating an exemplary method for product identification based on physiological response in accordance with exemplary embodiments.

FIG. 4 illustrates a method 400 for the identification of a product based on physiological responses to display of products to a user of a computing device.

In step 402, a plurality of display screens may be displayed, by a display device (e.g., the display device 214) interfaced with a computing device (e.g., the computing device 102) over a period of time, wherein at least one display screen includes one or more displayed products. In step 404, a display time for each displayed product may be stored in a memory (e.g., the memory 224) of the computing device corresponding to a time of the period of time at which the displayed product and the respective display screen is displayed on the display device.

In step 406, a plurality of physiological measurements may be received by a receiving device (e.g., the receiving device 202) of the computing device over the period of time for a first physiological function of a user (e.g., the user 104) of the computing device. In step 408, a change in the first physiological function may be detected by a detection module (e.g., the detection module 218) of the computing device based on the plurality of physiological measurements and a change time for the detected change.

In step 410, a query may be executed on the memory of the computing device by a querying module (e.g., the querying module 216) of the computing device to identify a specific displayed product based on a correspondence between the respective display time and the detected change time. In step 412, product data associated with the specific displayed product may be electronically transmitted by a transmitting device (e.g., the transmitting device 222) of the computing device.

In one embodiment, the product data may be electronically transmitted to the display device interfaced with the computing device. In a further embodiment, the product data may be included in a prompt for purchase of the specific displayed product. In some embodiments, the method 400 may further include tracking, by an optical imaging device interfaced with the computing device, eye movement of the user of the computing device over the period of time, wherein tracking eye movement includes identifying a screen position of the display device visualized by the user, wherein each displayed product is displayed at a specific screen position of the display device, and the specific screen position associated with the specific displayed product corresponds to a screen position visualized by the user at the change time based on the tracked eye movement.

In one embodiment, the method 400 may also include: receiving, by the receiving device of the computing device, a plurality of physiological measurements over the period of time for a second physiological function of the user of the computing device; and detecting, by the detection module of the computing device, a change in the second physiological function based on the plurality of physiological measurements and a second change time for the detected change, wherein the change time and the second change time are equivalent. In some embodiments, the plurality of physiological measurements may be read from an external measurement device interfaced with the computing device. In one embodiment, the first physiological function may be one of: heart rate, pupil dilation, and respiration rate.

Computer System Architecture

Figure 5:
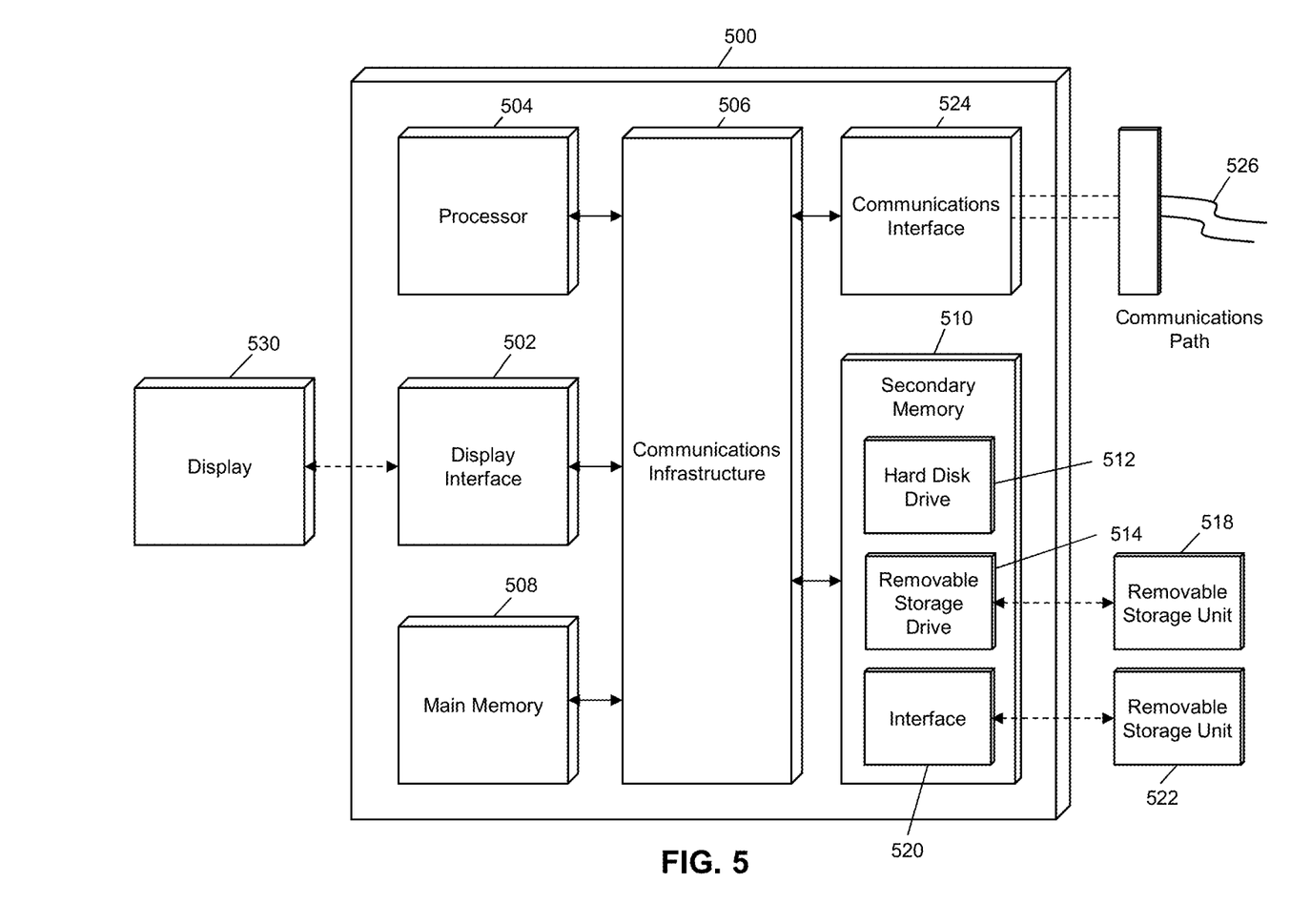
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the computing device 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for product identification based on physiological response. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for product identification based on physiological response, comprising:
receiving, by a receiving device of a computing device and from a remote device, a plurality of product information for a plurality of display screens;
displaying, by a display device interfaced with the computing device, the plurality of display screens over a period of time, wherein at least one display screen includes one or more displayed products from the plurality of product information, and wherein at least one other display screen includes one or more other displayed products from the plurality of product information;
storing, in a memory of the computing device, a display time for each displayed product corresponding to a time of the period of time at which the displayed product and the respective display screen is displayed on the display device;
receiving, by the receiving device of the computing device, a plurality of physiological measurements over the period of time for a first physiological function of a user of the computing device;
detecting, by a detection module of the computing device, a change in the first physiological function based on the plurality of physiological measurements and a change time for the detected change;
executing, by a querying module of the computing device, a query on the memory to identify a specific displayed product based on a correspondence between the respective display time and the detected change time; and
electronically transmitting, by a transmitting device of the computing device, product data associated with the specific displayed product.

2. The method of claim 1, wherein the product data is electronically transmitted to the display device interfaced with the computing device.

3. The method of claim 2, wherein the product data is included in a prompt for purchase of the specific displayed product.

4. The method of claim 1, further comprising:
tracking, by an optical imaging device interfaced with the computing device, eye movement of the user of the computing device over the period of time, wherein tracking eye movement includes identifying a screen position of the display device visualized by the user, wherein
each displayed product is displayed at a specific screen position of the display device, and
the specific screen position associated with the specific displayed product corresponds to a screen position visualized by the user at the change time based on the tracked eye movement.

5. The method of claim 1, further comprising:
receiving, by the receiving device of the computing device, a plurality of physiological measurements over the period of time for a second physiological function of the user of the computing device; and
detecting, by the detection module of the computing device, a change in the second physiological function based on the plurality of physiological measurements and a second change time for the detected change, wherein
the change time and the second change time are equivalent.

6. The method of claim 1, wherein the plurality of physiological measurements are read from an external measurement device interfaced with the computing device.

7. The method of claim 1, wherein the first physiological function is one of: heart rate, pupil dilation, and respiration rate.

8. A system for product identification based on physiological response, comprising:
- a receiving device of a computing device configured to receive, from a remote device, a plurality of product information for a plurality of display screens;
- a display device interfaced with the computing device configured to display the plurality of display screens over a period of time, wherein at least one display screen includes one or more displayed products from the plurality of product information, and wherein at least one other display screen includes one or more other displayed products from the plurality of product information;
- a memory of the computing device configured to store a display time for each displayed product corresponding to a time of the period of time at which the displayed product and the respective display screen is displayed on the display device;
- the receiving device of the computing device configured to receive a plurality of physiological measurements over the period of time for a first physiological function of a user of the computing device;
- a detection module of the computing device configured to detect a change in the first physiological function based on the plurality of physiological measurements and a change time for the detected change;
- a querying module of the computing device configured to execute a query on the memory to identify a specific displayed product based on a correspondence between the respective display time and the detected change time; and
- a transmitting device of the computing device configured to electronically transmit product data associated with the specific displayed product.

9. The system of claim 8, wherein the product data is electronically transmitted to the display device interfaced with the computing device.

10. The system of claim 9, wherein the product data is included in a prompt for purchase of the specific displayed product.

11. The system of claim 8, further comprising:
- an optical imaging device interfaced with the computing device configured to track eye movement of the user of the computing device over the period of time, wherein tracking eye movement includes identifying a screen position of the display device visualized by the user, wherein
- each displayed product is displayed at a specific screen position of the display device, and
- the specific screen position associated with the specific displayed product corresponds to a screen position visualized by the user at the change time based on the tracked eye movement.

12. The system of claim 8, wherein
- the receiving device of the computing device is further configured to receive a plurality of physiological measurements over the period of time for a second physiological function of the user of the computing device,
- the detection module of the computing device is further configured to detect a change in the second physiological function based on the plurality of physiological measurements and a second change time for the detected change, and
- the change time and the second change time are equivalent.

13. The system of claim 8, wherein the plurality of physiological measurements are read from an external measurement device interfaced with the computing device.

14. The system of claim 8, wherein the first physiological function is one of: heart rate, pupil dilation, and respiration rate.

* * * * *